United States Patent [19]
Takehara

[11] Patent Number: 5,818,709
[45] Date of Patent: Oct. 6, 1998

[54] INVERTER APPARATUS

[75] Inventor: Takao Takehara, Iwata-gun, Japan

[73] Assignee: Minebea Co., Ltd., Kitasaku-gun, Japan

[21] Appl. No.: 555,708

[22] Filed: Nov. 14, 1995

[30] Foreign Application Priority Data

Nov. 15, 1994 [JP] Japan .................................. 6-305471

[51] Int. Cl.$^6$ .................................................. H02M 3/24
[52] U.S. Cl. .......................................................... 363/95
[58] Field of Search ................................ 363/20, 21, 95, 363/98; 315/128, 307, 308, 244

[56] References Cited

U.S. PATENT DOCUMENTS

| | | | |
|---|---|---|---|
| 3,919,656 | 11/1975 | Sokal et al. . | |
| 4,492,899 | 1/1985 | Martin | 315/308 |
| 4,532,456 | 7/1985 | Knoll et al. | 315/223 |
| 4,607,323 | 8/1986 | Sokal et al. . | |
| 4,651,271 | 3/1987 | Grace . | |
| 5,068,570 | 11/1991 | Oda et al. | 315/128 |
| 5,159,541 | 10/1992 | Jain . | |
| 5,315,214 | 5/1994 | Lesea | 315/209 |

FOREIGN PATENT DOCUMENTS

| | | |
|---|---|---|
| 0169615 A2 | 1/1986 | European Pat. Off. . |
| 0206424 A2 | 12/1986 | European Pat. Off. . |
| 0206424 A3 | 12/1986 | European Pat. Off. . |
| 0343855 A | 11/1989 | European Pat. Off. . |
| 0503862 A | 9/1992 | European Pat. Off. . |

Primary Examiner—Matthew V. Nguyen
Assistant Examiner—Rajnikant D. Patel
Attorney, Agent, or Firm—Staas & Halsey

[57] ABSTRACT

An inverter apparatus includes a serial resonance circuit provided at the primary side of a booster transformer, a controlling means for turning on and off the serial resonance circuit with a switching element operating at the timing of phase advanced from the resonance frequency of the serial resonance circuit, and a load device connected to the secondary side of the booster transformer. The inverter apparatus may further include a detecting means provided at the secondary side of the booster transformer for detecting a load so that the controlling means upon receiving a signal output of the detecting means indicative of the load advances the timing phase of the turning on and off actions of the switch element when the load is smaller. Also the load device may be a cold cathode tube. It may be arranged for stabilizing a voltage output of the booster transformer that the booster transformer is coupled to a feedback line for feeding back a voltage to the negative input of an operational amplifier in the controlling means before the cold cathode tube starts a discharge action or that the voltage at a primary coil of the booster transformer is fed back to the negative input of an operational amplifier in the controlling means before the cold cathode tube is actuated. The present invention allows a single power switching element to build a semi-class E type voltage resonance inverter thus increasing the operational efficiency and minimizing the number of its components.

7 Claims, 7 Drawing Sheets standard voltage generator (a) optimum operation of class E  (b) operation of semi-class E wave forms of class E of resonant type inverter Notes: S is an input signal of switching drive (a) when the lamp current is large (b) when the lamp current is small

INVERTER APPARATUS

BACKGROUND OF THE INVENTION 1. (Field of the Invention)

The present invention relates to an inverter apparatus for supply of electric power to a load which has to be controlled in a wide range of current, and more specifically, to an inverter apparatus appropriate for use as a light switching device for executing a high-frequency conduction of a cold fluorescent lamp (CFL).

2. (Description of the Prior Art)

Inverter apparati are provided for converting a direct current of electric power to an alternating current form and also known as an inverse converters for use in a variety of electric systems. FIG. 7 shows a circuit diagram of a conventional inverter apparatus specified for a discharge tube. As shown in FIG. 7, a booster transformer 10 in a Royer oscillator circuit comprises a primary coil 10P, a secondary coil 10S, and a feedback coil 10F. The Royer oscillator circuit includes NPN switching transistors 11 and 12 as well as the booster transformer 10. There are also provided a capacitor 13 for voltage resonance and a choke coil 14. Accordingly, when the transistors 11 and 12 are not conducted, their collector-emitter voltage has a sine-wave and the waveform of voltage at the primary coil 10P and secondary coil 10S of the transformer 10 is also a sine-wave. The choke coil 14 is connected at input to a DC/DC converter described later and at output to a CFL 31. As the inverter performs self-oscillation, its output delivers a high voltage of sine-wave having a frequency of some tens KHz and hence, the CFL 13 is illuminated. Also, an integrated circuit (IC) 20 is provided which serves as a step-down chopper for controlling the base of a PNP switching transistor 21 which is a component of the DC/DC converter.

The IC 20 comprises an oscillator OSC for producing a triangle wave, two operational amplifiers A1 and A2 for comparing action, a PWM comparator COMP for comparing between output of the oscillator OSC and output of one of the two operational amplifiers A1 and A2, and an output transistor driven by the PWM comparator for conducting the base of the PNP switching transistor 21. The PWM comparator of the IC 20 compares two comparing inputs, one connected to the oscillator OSC and the other to the two operational amplifiers A1 and A2. The output of the oscillator OSC is compared with a higher one of the two voltage outputs of their respective operational amplifiers A1 and A2. The IC 20 will now be defined as a DC/DC converter controlling IC, even if the IC 20 may be used for other applications so long as its arrangement is not modified. Further shown are a fly-wheel diode 22, a choke coil 23, and a capacitor 24 which constitute in combination an LC filter. Denoted by 25 and 26 are a capacitor and a resistor respectively for determining the frequency of oscillation. There are C and R elements 27 to 30 for adjusting the paired inputs of the operational amplifiers A1 and A2 in phase with each other. Two diodes 15 and 16 are connected for rectifying positive components of a discharge current across the CFL 31. 18 and 19 are a resistor and a capacitor respectively which form a low pass filter for shaping the current waveform. The output of the low pass filter is connected to a positive input of the operational amplifier A2 in the DC/DC converter controlling IC 20.

In action, a voltage which is proportional to an average of positive cycles of the discharge current appears across the capacitor 19. The voltage is then compared by the operational amplifier A2 with a reference voltage of the DC/DC converter controlling IC 20. A resultant voltage output is proportional to a difference between the two voltages. The resultant voltage output is fed to the PWM comparator where it is compared with the triangle waveform of the oscillator OSC in the DC/DC converter controlling IC 20, as shown in FIG. 8. If the discharge current is increased by any incident, the voltage output of the operational amplifier A2 is shifted from the line B to the line A. This causes the output of the PWM comparator to shift from the line C to the line D. Accordingly, the on-time of the PNP switching transistor 21 is decreased attenuating the voltage output of the DC/DC converter and thus the source voltage of the Royer oscillator circuit. As the result, the discharge current is decreased. In other words, the discharge current can be controlled to a constant rate. Denoted by 32 and 33 are resistors for adjusting the voltage output of the DC/DC converter to a constant level. If the CFL 31 is not installed, the resistors 32 and 33 detect and control the voltage output of the DC/DC converter for setting the voltage across the secondary coil 10S of the booster transformer 10 to a constant level before starting a discharge action. The joint between the two resistors 32 and 33 is connected to the positive input of the operational amplifier A1 in the DC/DC converter controlling IC 20, thus forming a feedback loop and allowing a constant voltage output from the DC/DC converter. Both outputs of the operational amplifiers A1 and A2 are OR connected so that a higher level of the two outputs of the amplifiers A1 and A2 is selectively transferred to the PWM comparator.

It is however well known that the power converting efficiency of any conventional inverter apparatus has a limit. While the total efficiency η of the inverter apparatus is expressed by:

$$\eta = (\text{efficiency of converter}) * (\text{efficiency of inverter})$$

it is increased only through increasing the two efficiency rates. For example, the efficiency of the DC/DC converter is largely affected by switching loss in the switching transistor 21 and diode 22, and by copper loss in the choke coil 23. It is understood that such losses are hardly reduced to zero. Also, every conventional inverter apparatus includes a considerable number of components and its overall size and cost will be decreased with much difficulty.

It is an object of the present invention, in view of overcoming the above problems, to provide an inverter apparatus capable of increasing the efficiency as much as possible and controlling a wider range of current with the use of a minimum number of components.

SUMMARY OF THE INVENTION

For solving the above problems, an inverter apparatus according to the present invention is provided for converting a direct current supplied from a direct current power source to an alternating current by a converting means for alternating between two opposite directions of flow through the on/off actions of its switching element, and specifically characterized by a serial resonance circuit provided at the primary side of a booster transformer, a controlling means for turning on and off the serial resonance circuit with the switching element operating at the timing of phase advanced from the resonance frequency of the serial resonance circuit, and a load device connected to the secondary side of the booster transformer. The inverter apparatus of the present invention may include a detecting means provided at the secondary side of the booster transformer for detecting a load so that the controlling means upon receiving a signal output of the detecting means indicative of the load advances the timing phase of the turning on and off actions of the switch element when the load is smaller. Also the load device may be a cold cathode tube.

It may be arranged that the booster transformer is coupled to a feedback line for feeding back a voltage to the negative input of an operational amplifier in the controlling means, before the cold cathode tube is connected or a discharge action is started, so as to stabilize a voltage output of the booster transformer, or that the voltage at a primary coil of the booster transformer is fed back to the negative input of an operational amplifier in the controlling means before the cold cathode tube is connected or a discharge action is started so that a voltage output of the booster transformer is stabilized.

Action

The inverter apparatus of the present invention is a semi-class E type voltage resonance inverter as provided with a single power switching element, thus increasing the operating efficiency. Also, the apparatus includes an exclusive inverter circuit and will be composed of a smaller number of components.

BRIEF DESCRIPTION OF THE DRAWING(S)

DESCRIPTION OF THE PREFERRED EMBODIMENT(S)

Figure 1:
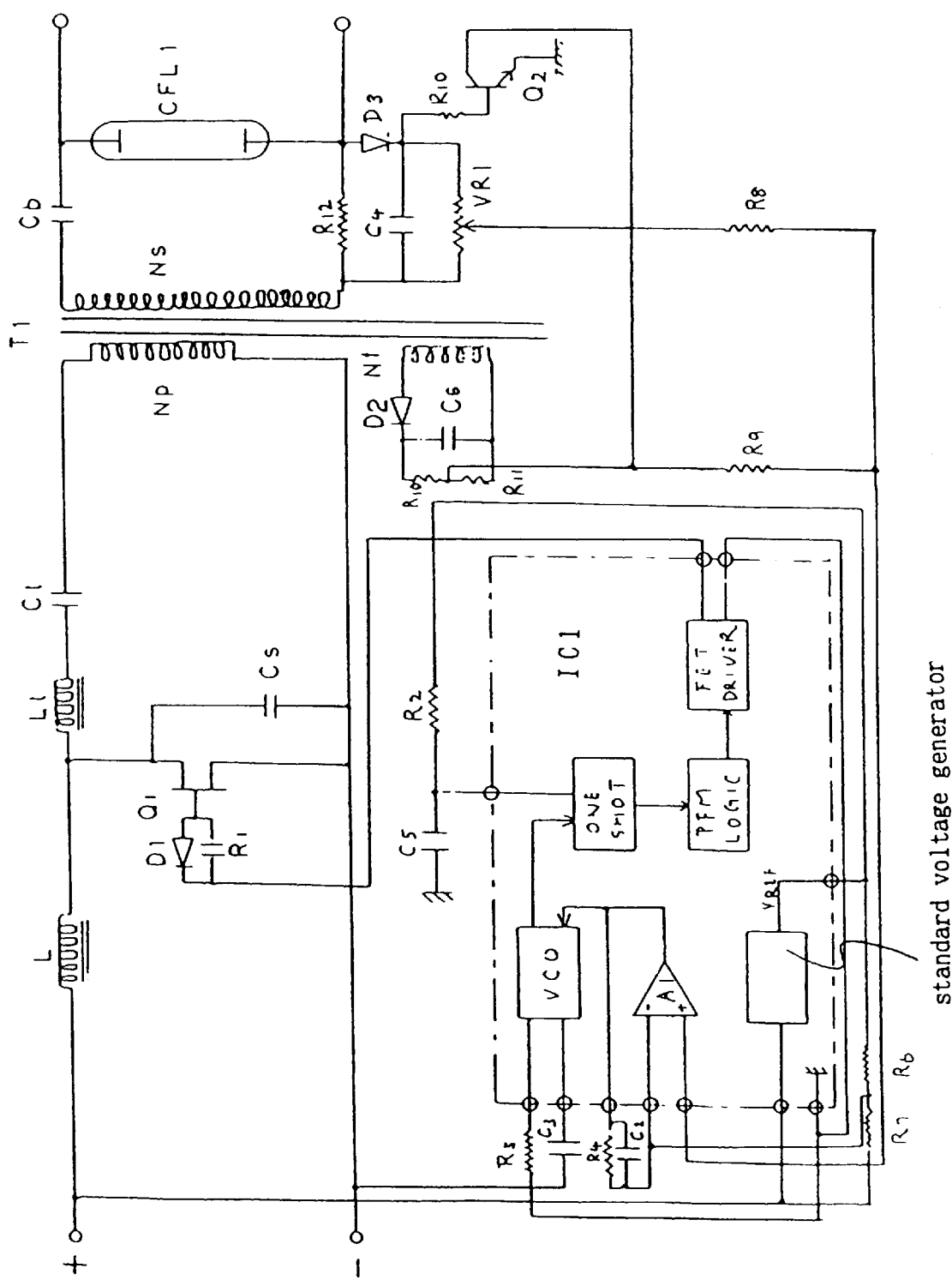
FIG. 1 is a circuit diagram showing one embodiment of the present invention.

One preferred embodiment of the present invention will be described in detail referring to the accompanying drawings. FIG. 1 shows a circuit diagram of an inverter apparatus provided with a load of a CFL. As shown in FIG. 1, the circuit comprises a power MOSFET Q1, a choke coil L, a coil Lt, a capacitor Ct, and a voltage resonance capacitor Cs, serving as a semi-class E voltage resonance inverter. A high frequency AC voltage from the semi-class E voltage resonance inverter is boosted by a booster transformer T1 and fed to the CFL for direct driving. As known, the semi-class E voltage resonance inverter is capable of producing a sine-wave output as a current across its power switching element has a sine-wave component and a voltage supplied to its switch has a sine-wave form.

Figure 2:
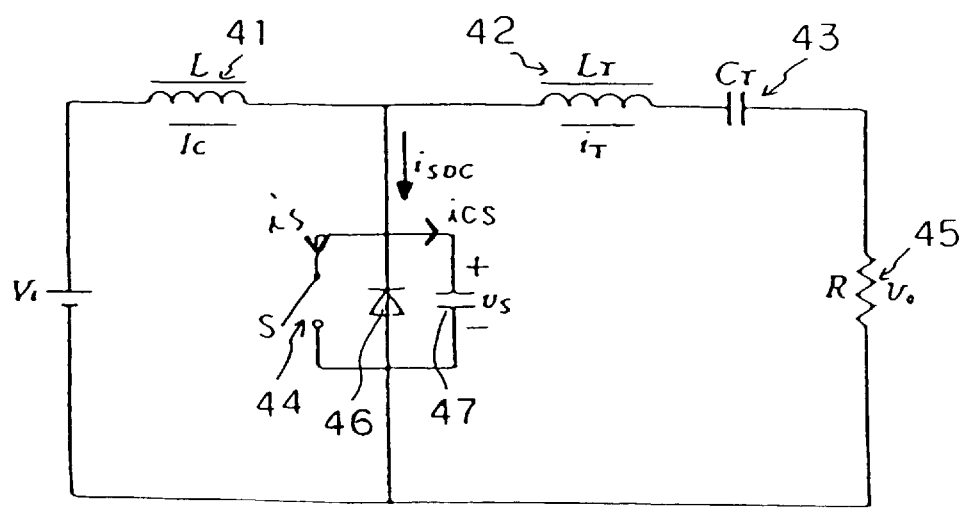
FIG. 2 is a diagram of a basic circuit of a semi-class E type voltage resonance inverter.

The principle of action of the semi-class E voltage resonance inverter will now be explained referring to FIG. 2. FIG. 2 illustrates a basic circuit of the semi-class E voltage resonance inverter. As shown, the choke coil is a reactor 41 of its current is approximately a direct current Ic. An inductor 42 and a capacitor 43 constitute a resonance circuit. Through turn-on and turn-off actions of a switch 44, a pulse form of voltage is supplied to a sync circuit including the inductor 42, the capacitor 43, and a resistor 45. When the (turn on/turn off) action or switching frequency of the switch 44 is slightly higher than the resonance frequency of the inductor 42 and capacitor 43, a current iT in the tuning circuit is approximately a sine-wave. In that case, the tuning circuit has an inductive reactance and its current is lagged phase with the phase of voltage. A parallel circuit comprising a diode 46, a capacitor 47, and the switch 44 has a current isdc of a sine-wave form because Ic=isdc+iT where iT is of a sine-wave form.

Figure 3:
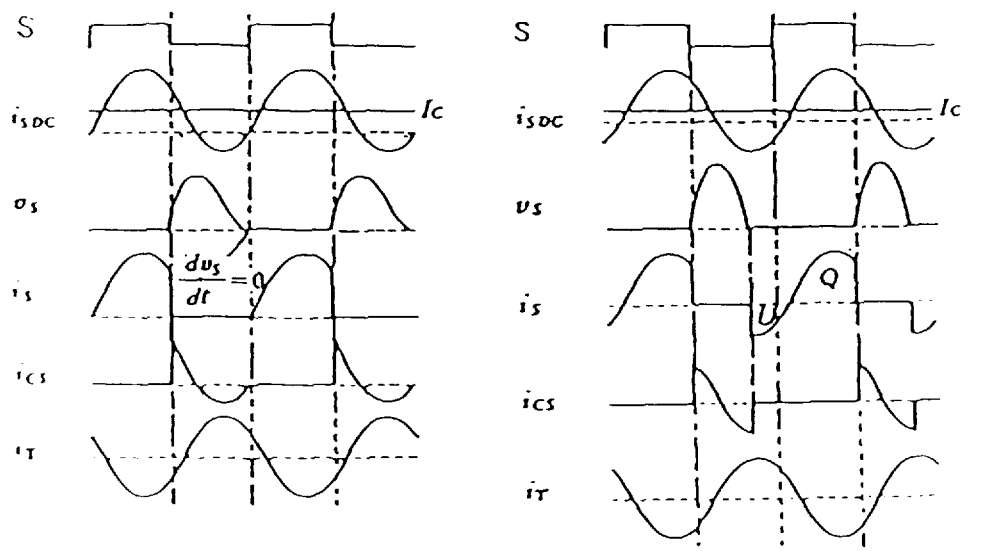
FIG. 3 is an operating waveform diagram of a class E resonance inverter.

FIG. 3(a) shows operating waveforms in the class E resonance inverter with the switch having 50% of a duty. When the switch S is turned off, the sine-wave current flows across the capacitor Cs which is then charged with ics and the voltage vs rises up from zero to form a sine-wave. Accordingly, the turn off action of the switch triggers zero voltage, non-zero current switching. The switch voltage vs drops in a near-zero gradient of dvs/dt at an optimum resistance Ropt, as shown in FIG. 3(a). When vs=0 and dvs/dt=0, the switch S is turned on. If the resistance is smaller than Ropt, the voltage vs of the switch drops down in a sharp gradient of dvs/dt to zero, as shown in FIG. 3(b), and the reverse diode Ds connected in parallel is turned on. While the switch voltage vs is clamped to zero, the switch S is turned on. This is a semi-class E action implementing zero voltage switching similar to the action of a voltage resonance switch. When the circuit is used as a switching regulator, the class E action cannot be executed throughout the full-scale viable range of load and input voltages but the semi-class E action will be feasible. Since the impedance in an R-L-C tuning circuit is highly responsive to the switching frequency, control of the output voltage Vo (=it) with switching frequency modulation will minimize a change in the switching frequency.

Returning to FIG. 1, the booster transformer T1 comprises a primary coil Np, a secondary coil Ns, and a feedback coil Nf as is connected to the N-channel power MOSFET Q1 and the choke coil L. The serial composite impedance of leakage inductance lg of the booster transformer T1, the coil Lt, and the capacitor Ct create a resonance circuit. The resonance circuit is connected in series to the CFL 1. The resonance frequency Fr of the resonance circuit is then obtained from:

$$Fr = \frac{1}{2\pi \sqrt{(L_T + 1\,g)\left(\frac{C_T * C_2}{C_T + C_2}\right)}}$$

where C2 is the transformer primary conversion of a ballast capacitor Cb and expressed by C2=n2Cb, n being a boost ratio of the booster transformer T1. The voltage resonance capacitor Cs operates with the choke coil L to produce a sine-wave voltage between drain and source when the power MOSFET Q1 is not conducted. Denoted by IC1 is a voltage resonance switching IC for controlling the gate of the power MOSFET Q1. The voltage resonance switching IC comprises a voltage-controlled oscillator (VCO), an operational amplifier A1, a switching frequency modulator circuit (PFMLOGIC), a FET driver driven by FEMLOGIC for conducting the gate of the power MOSFET Q1 and standard voltage(5V) generator. There are provided a resistance R4 and a capacitor C2 for adjusting the two inputs of the operational amplifier A1 in phase with each other in the voltage resonance switching IC. A C-R element comprises R5 and C3 for determining the oscillation frequency of the voltage-controlled oscillator (VCO). R6 and R7 are resistors for DC biasing at the negative input of the operational amplifier A1 in IC1. There are also provided a gate drive resistor R1 for the power MOSFET Q1, a speed-up diode D1 for releasing a gate accumulated charge, and a resistor R12 for detecting a clamp current. A combination of a diode D3 and a capacitor C4 is provided for detecting the positive cycles of a lamp current to produce direct current and its output is transferred through a lamp current setting variable resistor VR1 and a resistor R8 to the positive input of the operational amplifier A1 in IC1. More particularly, the center tap of the variable resistor VR1 draws a voltage proportional to an average of the positive cycles of discharge current and sends it to the operational amplifier A1 where the t voltage is compared with a stored reference voltage of IC1 to calculate a difference. A resultant voltage output proportional to the difference is transferred to the input of the voltage-controlled oscillator (VCO) for controlling its oscillation frequency. Accordingly, if the discharge current is increased by any incident, the output of the operational amplifier A1 hang downs thus increasing the oscillation frequency of the voltage-controlled oscillator. In response to a hang down of the output of the voltage-controlled oscillator, a monostable multivibrator (ONESHOT) is activated producing a high level output. The output of the monostable multivibrator is maintained at the high level by a resistor R2 and a capacitor C5 throughout a duration which may be determined by a pulse-width setting time constant of the monostable multivibrator.

Figure 4:
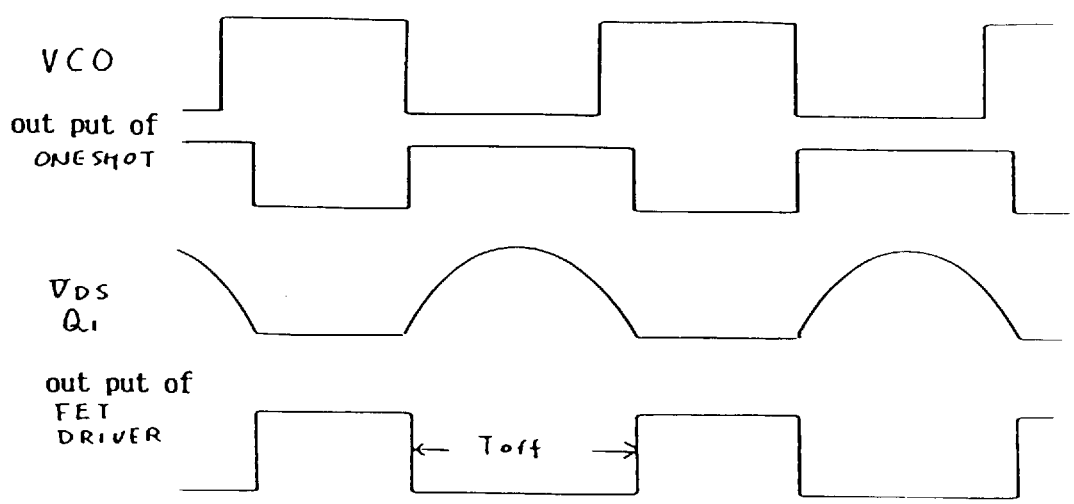
FIG. 4 is an operating waveform diagram of the embodiment of the present invention.
Figure 4:
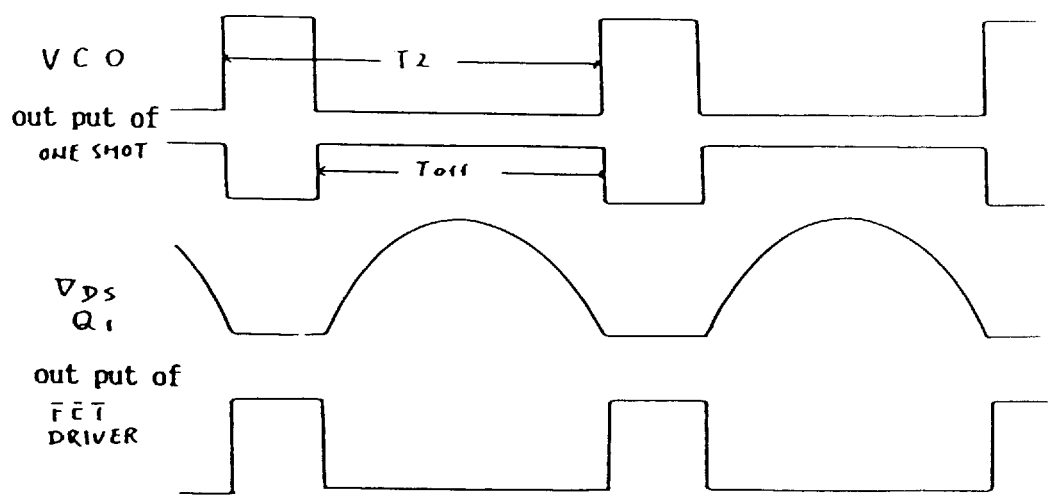

Referring to FIG. 4(b), Toff is determined considering a variation in the performance of the choke coil 1 and voltage resonance capacitor Cs and a change in the resonance frequency due to thermal variation so that the semi-class E action is successfully carried out. When the oscillation frequency increases with Toff remaining unchanged, the on duration of the switch is decreased thus lowering the input current of the CFL to a constant rate, as shown in FIG. 4. If the lamp current drops, the output of the operational amplifier A1 is decreased thus lowering the oscillation frequency of the voltage-controlled oscillator and allowing the supply of a constant current.

Figure 5:
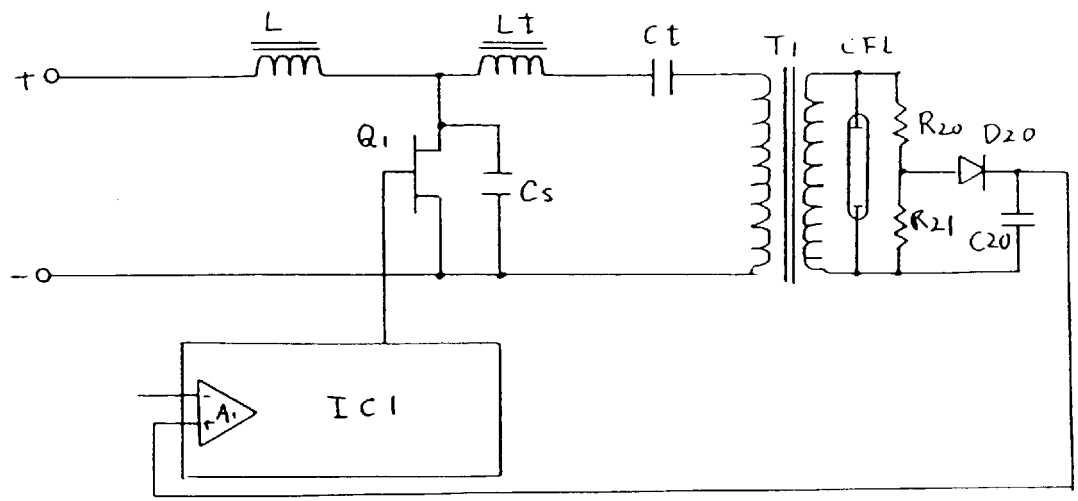
FIG. 5 is a partial circuit diagram showing another embodiment of the present invention.

For starting a discharging action in the CFL, the CFL has to be loaded with a high voltage of about 1 kV. This release voltage may be set, as shown in FIG. 5, by dividing the voltage at the secondary coil Ns of the booster transformer T1 to a divided voltage with two resistors R20 and R21, rectifying it with a combination of a diode D20 and a capacitor C20, and transmitting it to the positive input of the operational amplifier A1 in the voltage resonance switching IC IC1. The disadvantage of this setting is that the resistor R20 of high voltage type is needed and the stable action of non feedback loop will be declined due to a time delay caused by R20, D20, and C20. For correcting the disadvantage, the booster transformer T1 is provided with a feedback coil Nf as shown in FIG. 1. In action, a voltage output of the feedback coil Nf is rectified by a diode D2 and a capacitor C6 and divided voltage by two resistors R10 and R11. A divided output voltage is then transferred through a resistor R9 to the positive input of the operational amplifier A1 in IC1 for feedback. Assuming that the number of windings and the voltage of the secondary coil Ns are Ns and Vs respectively, and the number of windings and the voltage of the feedback coil Nf are Nf and Vf respectively, the voltage Vs of the secondary coil Ns is expressed by Vs= (Ns/Nf)Vf. Hence, Vs can be maintained constant by controlling Vf regardless of the level of DC voltage to be supplied. Also, Nf may be identical in the level to the input voltage of the operational amplifier A1 thus remaining low and hardly producing any phase delay.

The collector of a switching transistor Q2 is connected to the joint between the resistors R9, R10, and R11. If CFL1 is disconnected or before the discharge action is started, the voltage across the capacitor C4 is zero and the switching transistor Q2 remains not conducted. Accordingly, the voltage at the secondary coil Ns of the booster transformer T1 is maintained constant regardless of an input level of the DC voltage by the negative feedback action through the resistors R10, R11, and R9 and the operational amplifier A1. When CFL1 is connected and its discharge current flows, the switching transistor Q2 is turned on with the voltage across the capacitor C4 set to more than 0.7 volts. Accordingly, the resistors R10 and R11 interrupt the constant voltage action and allow only the constant current action with the operational amplifier A1.

Figure 6:
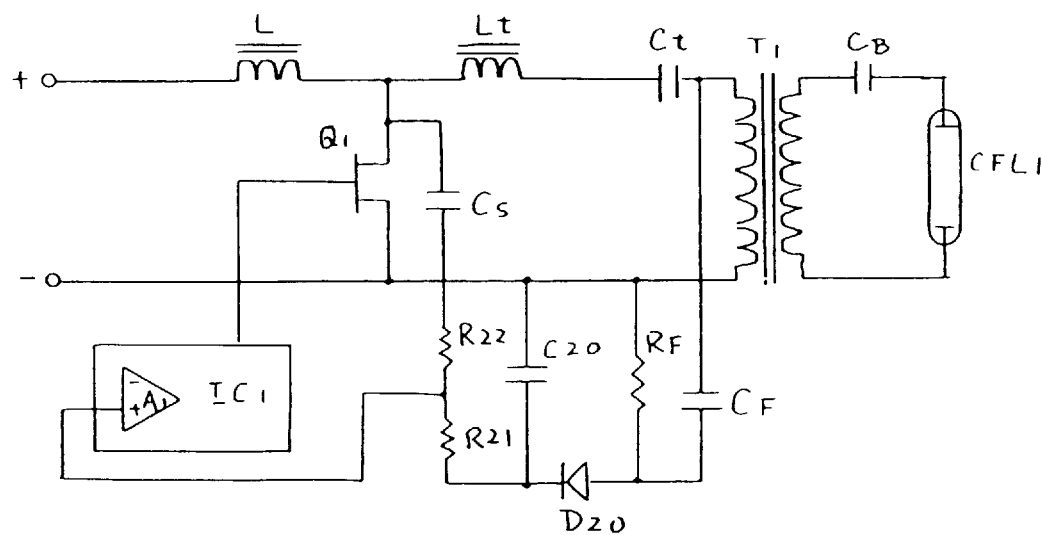
FIG. 6 is a partial circuit diagram showing a further embodiment of the present invention.
Figure 7:
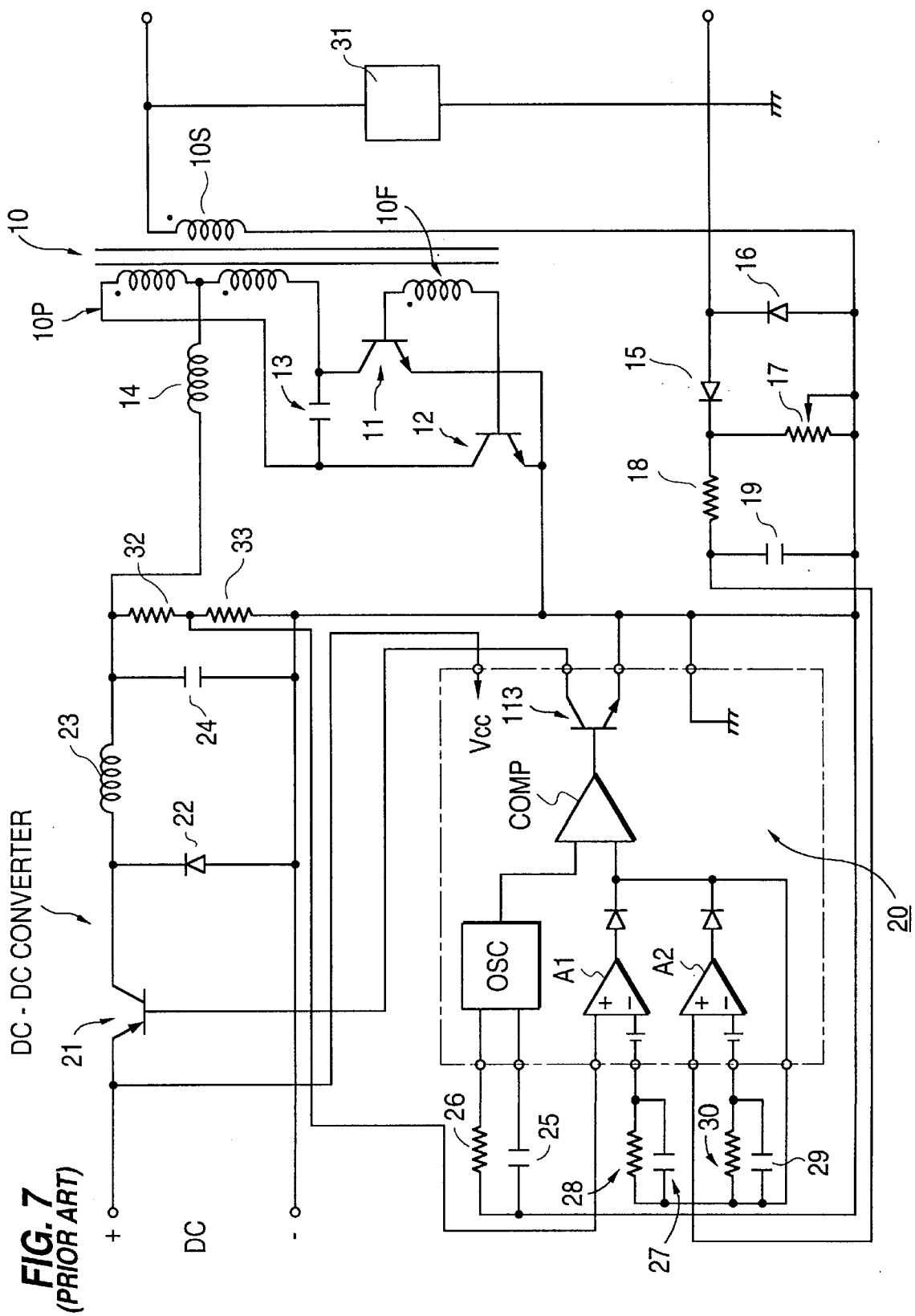
FIG. 7 is a circuit diagram of a prior art.
Figure 8:
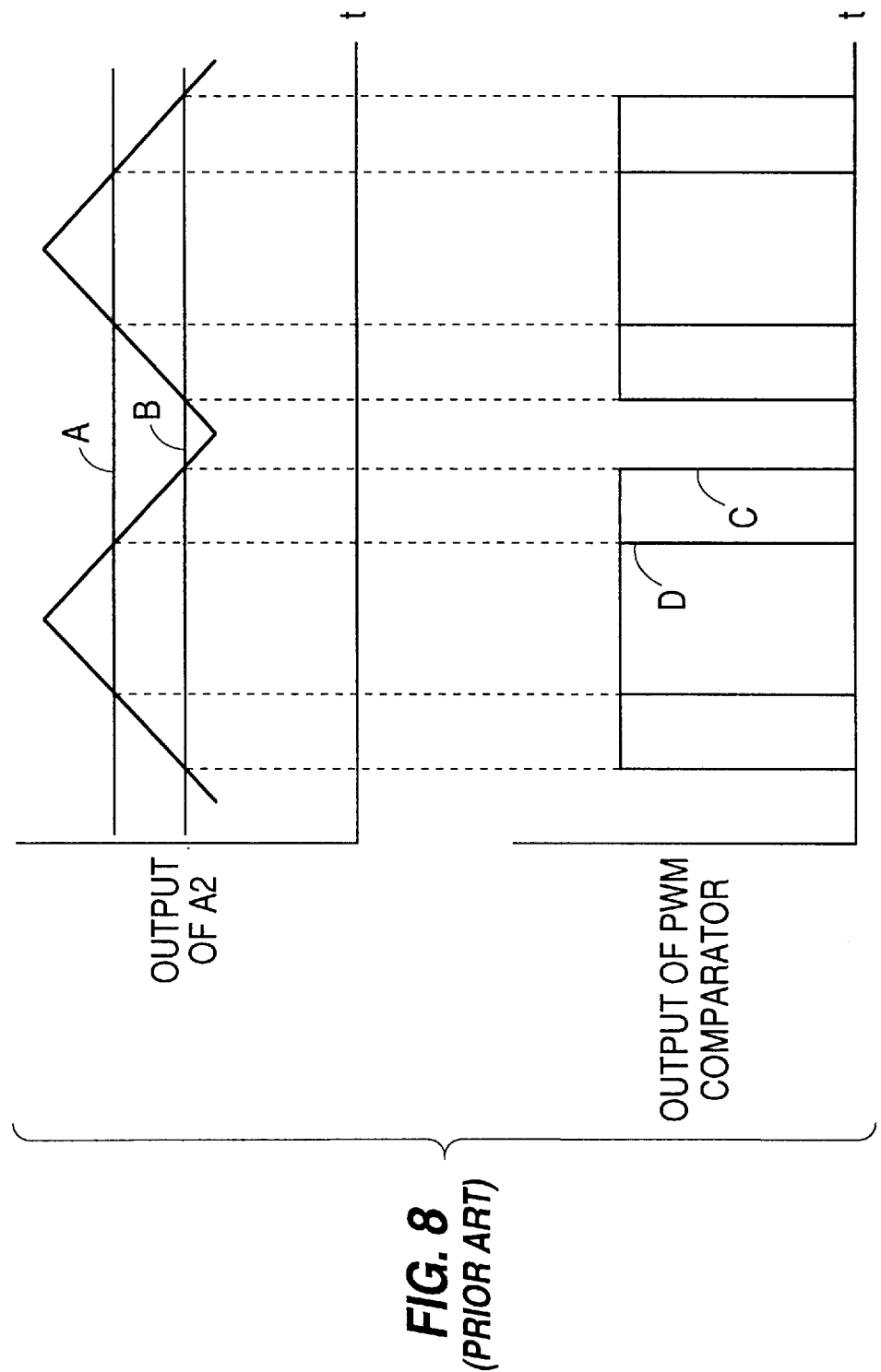
FIG. 8 is an operating waveform diagram of the prior art

The setting of the release voltage may also be implemented by a circuit shown in FIG. 6. As shown, the voltage at the primary coil Np of the booster transformer T1 is detected by a combination of a capacitor CF and a resistor RF, rectified by a diode D20 and a capacitor C20, and divided by two resistors R21 and R22 before being transferred to the operational amplifier A1 in IC1.

Advantage__of__the__Invention

As set forth above, the inverter apparatus of the present invention comprises a semi-class E type voltage resonance inverter thus allowing its single power switching element to be operated at a higher efficiency. In addition, the apparatus includes an exclusive inverter circuit and will be composed of a smaller number of components hence contributing to the minimum of the overall dimensions.

I claim:

1. An inverter apparatus for converting a direct current supplied from a direct current power source to an alternating current by a converting means for alternating between two opposite directions of flow through on/off actions of a switching element, comprising:

a booster transformer;

a semi-class E voltage resonance inverter having a serial resonance circuit provided at a primary side of the booster transformer;

a controlling means for turning on and off the serial resonance circuit with the switching element operating at the timing of phase advanced from the resonance frequency of the serial resonance circuit; and a load device connected to a secondary side of the booster transformer.

2. An inverter apparatus according to claim 1, further comprising a detecting means provided at the secondary side of the booster transformer for detecting a load so that the controlling means, upon receiving a signal output from the detecting means indicative of the load, advances a timing phase of the turning on and off actions of the switching element when the load is smaller.

3. An inverter apparatus according to claim 1, wherein the load device is a cold cathode tube.

4. An inverter apparatus according to claim 3, wherein the booster transformer is coupled to a feedback line for feeding back a voltage to a negative input of an operational amplifier in the controlling means, before the cold cathode tube is connected or a discharge action is started, so as to stabilize a voltage output of the booster transformer.

5. An inverter apparatus according to claim 3, wherein the voltage at a primary coil of the booster transformer is fed back to a negative input of an operational amplifier in the controlling means before the cold cathode tube is connected or a discharge action is started so that a voltage output of the booster transformer is stabilized.

6. An inverter apparatus, comprising:

a converting means for converting a direct current to an alternating current;

a booster transformer having a primary side and a secondary side;

a semi-class E voltage resonance inverter having a serial resonance circuit disposed at the primary side of said booster transformer; and a controller including a switching element that turns on and off said serial resonance circuit.

7. An inverter apparatus as claimed in claim 6, further comprising a load device connected to the secondary side of said booster transformer.

* * * * *